United States Patent [19]

Crews et al.

[11] 4,137,982

[45] Feb. 6, 1979

[54] REINFORCED RADIATOR MOUNTING FOR HEAVY VEHICLES

[75] Inventors: Donald R. Crews, Peoria; Billy J. Davis, East Peoria; Roger E. Treick, Peoria; John C. Wellauer, Dunlap, all of Ill.

[73] Assignee: Caterpillar Tractor Co., Peoria, Ill.

[21] Appl. No.: 822,850

[22] Filed: Aug. 8, 1977

[51] Int. Cl.² .................................................. B60K 11/04
[52] U.S. Cl. ........................... 180/68 R; 123/41.51; 165/67; 165/76; 165/149
[58] Field of Search ............... 180/68 R, 68 P, 54 A; 165/41, 51, 67, 69, 76, 140, 144, 149; 123/41.51

[56] References Cited

U.S. PATENT DOCUMENTS

| | | | |
|---|---|---|---|
| 1,593,244 | 7/1926 | Cutler | 165/69 |
| 1,593,245 | 7/1926 | Cutler | 165/149 |
| 2,505,790 | 5/1950 | Panthofer | 165/140 |
| 2,615,687 | 10/1952 | Simmons | 165/76 |
| 2,859,016 | 11/1958 | Ephraim, Jr. et al. | 165/51 |
| 3,446,276 | 5/1969 | Poehlman | 165/119 |
| 3,788,419 | 1/1974 | Drone et al. | 180/68 R |

Primary Examiner—David M. Mitchell
Attorney, Agent, or Firm—James R. Bell

[57] ABSTRACT

A receptacle is provided to receive and reinforce an engine fluid cooling radiator core. The core is secured within the receptacle and mounted adjacent an implement fluid cooling core. The implement cooling core and the receptacle are connected by at least one, but preferably two connector bars. The connector bars are resiliently connected to an associated supportive frame.

5 Claims, 5 Drawing Figures

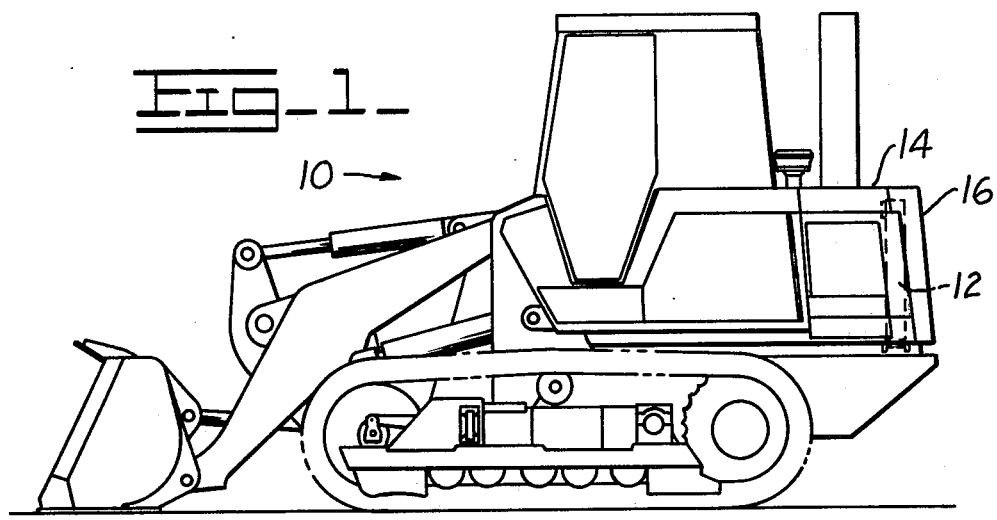
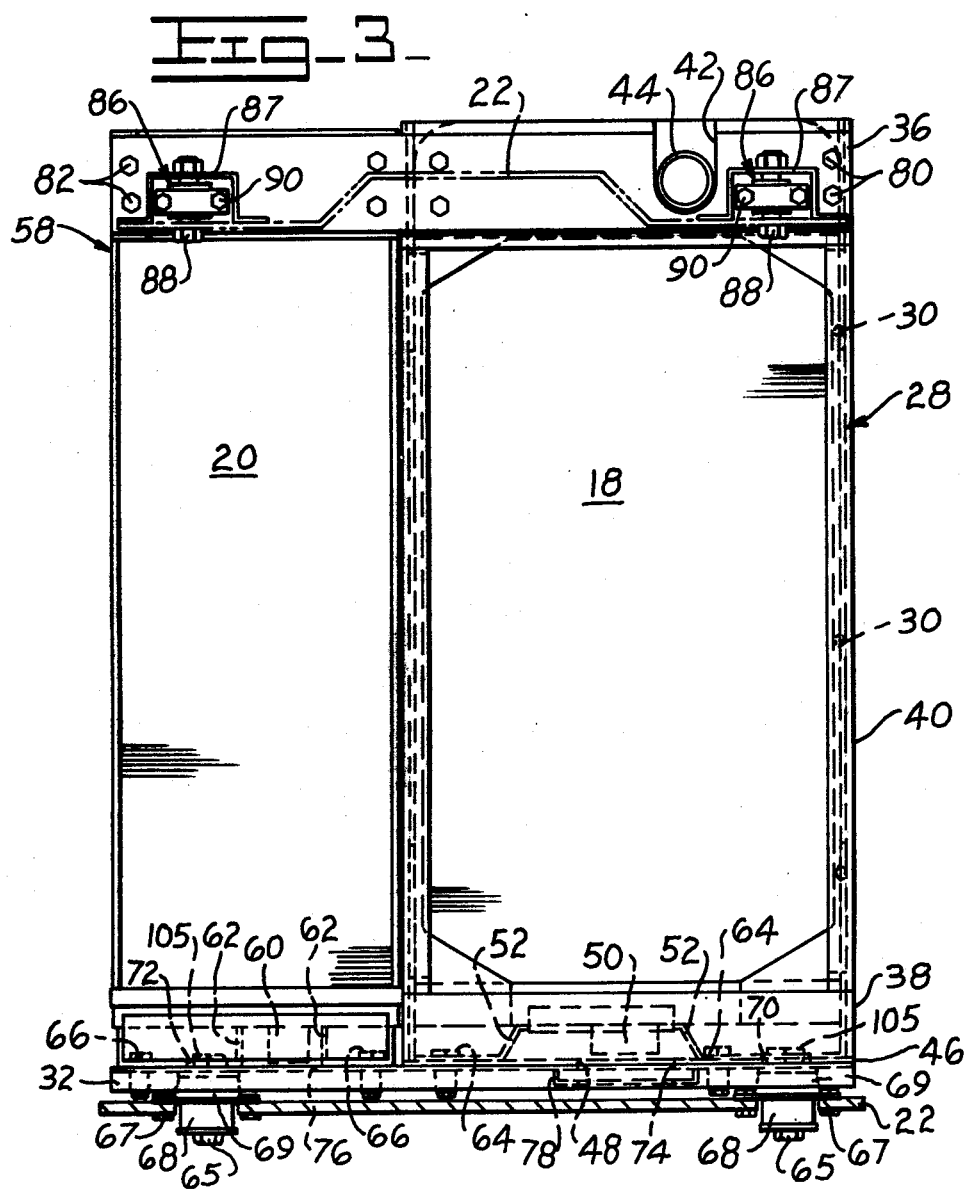

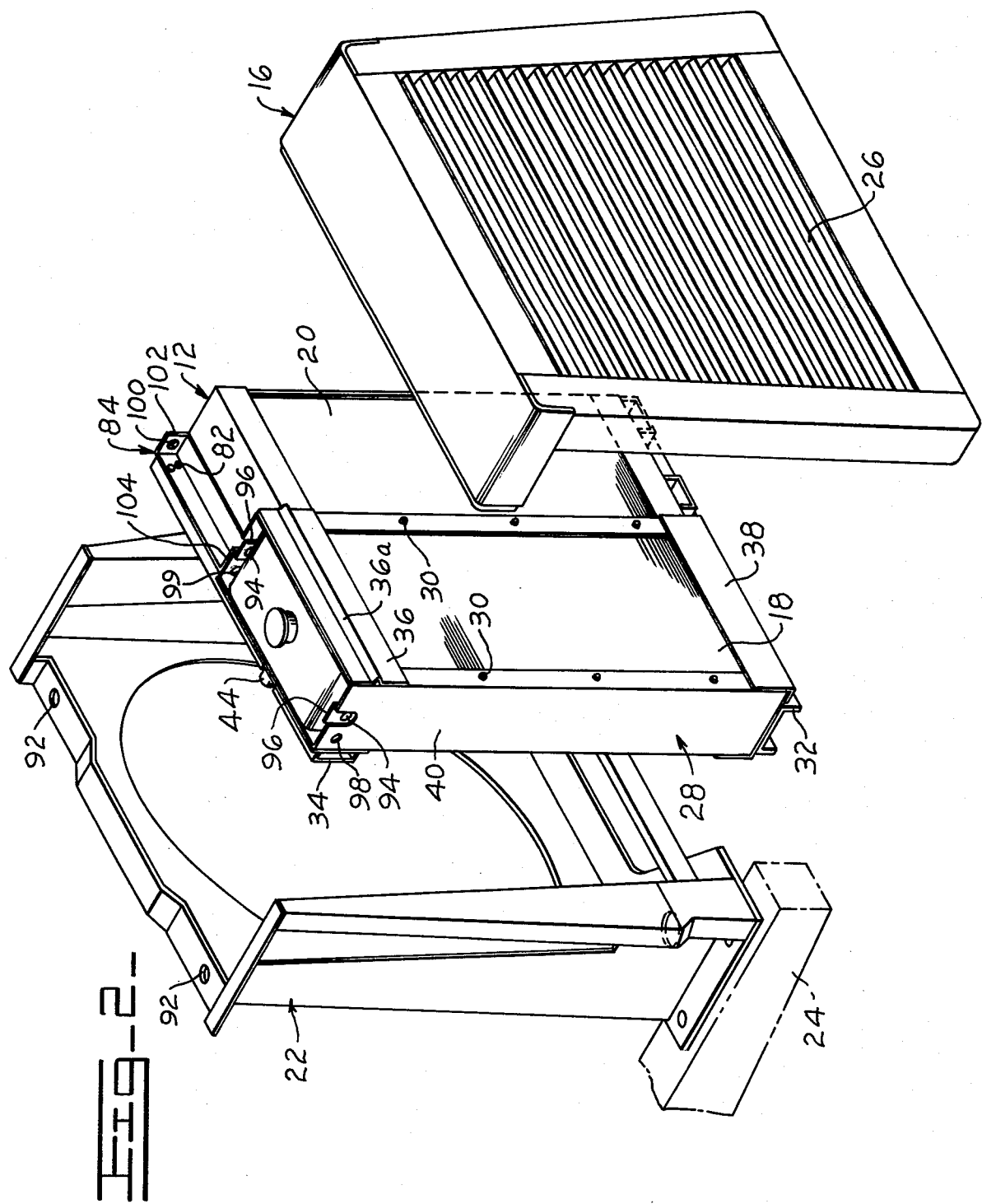

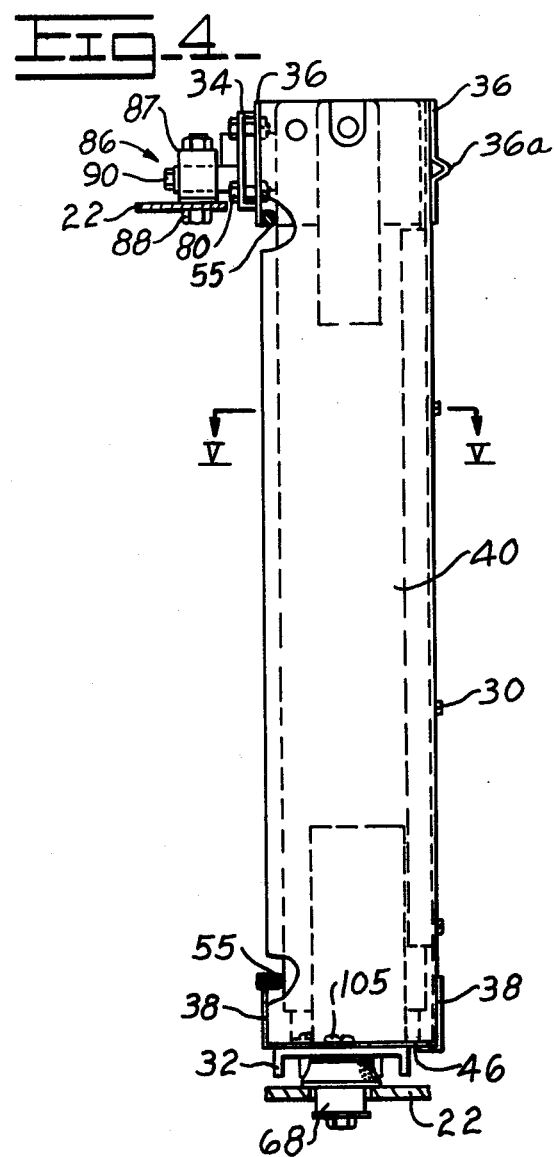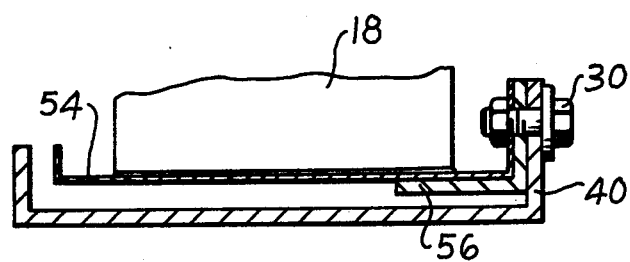

REINFORCED RADIATOR MOUNTING FOR HEAVY VEHICLES

BACKGROUND OF THE INVENTION

1. Field of the Invention

This invention relates generally to heat exchange devices and more particularly to those of the radiator core type with edge cover or frame means.

2. Description of the Prior Art

Radiator cores for cooling engine coolants are commonly made of relatively nonrigid, lightweight copper, steel and aluminum components.

In the past, engine fluid cooling cores for cooling water or other suitable coolants have been mounted rigidly with frame-like members for reinforcing purposes. In vehicles using hydraulic or transmission oil which is cooled by circulating through an implement fluid cooling core, such a cooling core has been mounted along with the engine fluid cooling core adjacent a cooling fan. Frame-like members are not generally needed for reinforcing the implement core since the implement core is usually constructed of relatively rigid steel components.

When implement and engine cooling cores are mounted adjacent each other a substantial mounting apparatus is required especially for the engine cooling core. This is so due to the need for reducing stress and strain on the substantially nonrigid engine cooling core. However, substantial mounting apparatus usually requires bulky components which are not easily removable when replacement or repair are required.

In view of the foregoing, it would be advantageous to provide apparatus for mounting an engine cooling core and an implement cooling core which limits stress and strain acting on both cores and which provides for relatively easy replacement of either core separately or both cores simultaneously when required for replacement or repair.

SUMMARY OF THE INVENTION

The present invention is directed to overcoming one or more of the problems as set forth above.

According to the present invention this is accomplished by providing a receptacle to receive and reinforce an engine cooling core. The core is secured in the receptacle. An implement cooling core is mounted adjacent the receptacle. The implement core and the engine core receptacle are connected as a unit by connector bars.

The implement core can be disconnected from the bars for removal while the engine core remains connected. Conversely, the engine core can be disconnected from the bars for removal while the implement core remains connected. Also, both cores can remain connected to the bars for simultaneous mounting or removal as a unit.

The connector bars are preferably resiliently mounted to an associated supported frame such as the frame of an associated vehicle.

The foregoing and other advantages will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is a side elevational view illustrating a vehicle including cores mounted therein in accordance with this invention;

FIG. 2 is a perspective view illustrating the mounting of the implement and engine cooling cores of this invention;

FIG. 3 is a frontal view illustrating the side-by-side mounting of the implement and engine cooling cores;

FIG. 4 is a side elevational view illustrating the resilient mounting of cores of this invention; and FIG. 5 is an exploded partial view illustrating the water cooling core of this invention connected within a receptacle as viewed from line V—V of FIG. 4.

DETAILED DESCRIPTION

In FIG. 1, an earthmoving vehicle is generally designated 10 and is depicted only for the purpose of illustrating a type of vehicle using fluid which is circulated and cooled for reuse in the vehicle. Such cooling is accomplished by means of a radiator main core portion shown in phantom outline and generally designated 12 and typically mounted within an engine compartment designated 14 adjacent a radiator guard 16.

FIG. 2 illustrates main core portion 12 including an engine fluid cooling core 18 and an implement fluid cooling core 20 connected in side-by-side relationship. Core portion 12 is preferably mounted in a sub-frame portion 22 of vehicle 10. The sub-frame is usually mounted on a portion of the main vehicle frame 24. Well known radiator guard 16 typically including grille 26 is mounted adjacent main core 12 and releasably fastened to sub-frame 22 as is well known.

Also in FIG. 2, a receptacle means such as a frame-like structure 28, receives engine cooling core 18 therein. Core 18 can be releasably secured in frame 28 by a plurality of bolts 30. In this manner, frame 28, preferably of steel, reinforces the relatively nonrigid engine cooling core 18.

Selective connection means such as connector bars 32, 34 are provided for independent connection to the engine cooling core 18 for independent connection to implement cooling core 20 and for simultaneous connection to both of the cores. In this manner, either of the cores 18, 20 can be removed from or installed into vehicle 10 independently of the other, or both cores can be removed or installed simultaneously.

In FIGS. 2, 3 and 4, engine core 18 is mounted in fabricated steel frame 28 which includes upper face plates 36 and lower face plates 38 interconnected by side plates 40. One of the upper plates 36 includes a groove 42 for accommodating inlet 44 of engine core 18. Another of the upper face plates preferably includes a reinforcing rib 36a. A bottom plate 46 includes an opening 48 for accommodating outlet 50 which is preferably recessed between extending legs 52 of engine core 18. Resilient members 55, FIG. 4, are preferably mounted in frame 28 for engagement with core 18 for limiting undesirable air flow between upper plate 36 and core 18 and between lower face plate 38 and core 18.

The bolts 30 extend through side plates 40 for securing engine core 18 within frame 28. This is further illustrated in FIG. 5 wherein a flange 54 is preferably connected to engine core 18. Flange 54 includes a reinforcing corner member 56 preferably welded thereto. Bolt 30 thus passes through side plate 40 and extends into and through corner member 56 and flange 54 for releasably securing engine core 18 within frame 28.

Implement core 20, FIG. 3, is substantially rigid usually being constructed of steel and thus does not generally require a reinforcing frame similar to frame 28. Upper or inlet end 58 of implement core 20 is preferably mounted in side-by-side relationship with inlet 44 of engine core 18. Similarly, a lower end including outlet 60 of implement core 20 is preferably mounted in side-by-side relationship with outlet 50 of engine core 18. Also, it is preferable that outlet 60 is recessed between extended legs 62 of implement core 20.

First connector bar 32, FIGS. 3 and 4, is preferably a steel channel extending along the bottom of side-by-side engine and implement cores 18, 20 adjacent their respective outlets 50, 60. Bar 32 is preferably connected to core 18 by bolts 64 which preferably extend through bar 32, bottom plate 46 of receptacle 28 and extended legs 52. Also, bar 32 is preferably connected to core 20 by bolts 66 which preferably extend through bar 32 and extended legs 62. In this manner, both cores 18, 20 and bar 32 can be connected for unitary simultaneous removal from or installation into vehicle 10. Furthermore, it will be appreciated that bolts 64 can be removed to separate bar 32 from core 18 and permit independent removal of frame 28 and engine core 18 and, similarly, bolts 66 can be removed to separate bar 32 from core 20 and permit independent removal of implement core 20.

Well known mounts 68, FIGS. 3 and 4, provide a first means for resiliently mounting the cores. Mounts 68 are preferably secured to frame portion 22 by bolts 67 and are connected to bar 32 by bolts 65 threaded into weld nuts 105 to support cores 18,20. Mounts 68 include well known resilient pads 69 in engagement with bar 32. An opening 70 in bottom plate 46 and in leg 52 permits one of the weld nuts 105 to extend therethrough free of engagement with core 18 and receptacle 28. In this manner, only bolts 64 need be disconnected to permit independent removal of core 18 and frame 28 from bar 32. Similarly, an opening 72 in leg 62 permits another weld nut 105 to extend therethrough free of engagement with core 20. In this manner, only bolts 66 need be disconnected to permit independent removal of core 20 from bar 32. Since mounts 68 are secured to bar 32, the mounts must be disconnected from bar 32 by removing bolts 65 to permit simultaneous removal of cores 18, 20 and receptacle 28 along with bar 32. Therefore, such simultaneous removal does not require disconnecting bolts 64, 66 from bar 32. It should be noted that openings 74, 76 are provided in bar 32 to permit access to outlets 50,60 of cores 18,20, respectively. Preferably, a protective flange 78 is connected to bar 32 adjacent outlet opening 74.

Second connector bar 34, FIGS. 3 and 4, is also preferably a steel channel similar to bar 32. Bar 34 preferably extends along the top or inlet end of side-by-side engine and implement cores 18,20, respectively. Bar 34 is preferably connected to frame 28 by bolts 80 which preferably extend through bar 32 and upper face plate 36, FIG. 4. Also, bar 34 is preferably connected to core 20 by bolts 82 which preferably extend through bar 34 and angle member 84 preferably welded to core 20, see FIG. 2. In this manner, both cores 18, 20, frame 28 and bar 34 can be connected for unitary simultaneous removal from or installation into vehicle 10. Furthermore, it will be appreciated that bolts 80 can be removed to separate bar 34 from frame 28 and permit independent removal of frame 28 including core 18 and, similarly, bolts 82 can be removed to separate bar 34 from core 20 and permit independent removal of implement core 20.

Well known resilient mounts 86, FIGS. 3 and 4, provide a second means for resiliently mounting cores 18,20. Mounts 86 are preferably secured to frame portion 22 and are connected to bar 34 to aid in supporting cores 18 and 20. Mounts 86 include well known resilient bearing members 87. Bolts 88 secure mounts 86 in bolt holes 92, FIG. 2, of frame portion 22 and bolts 90 secure mounts 86 to bar 34. Since mounts 86 are secured to bar 34, the mounts must be disconnected from bar 34 at bolts 90 to permit simultaneous removal of cores 18,20 along with bar 34. However, such simultaneous removal does not require disconnecting bolts 80,82 from bar 34.

Referring now to FIGS. 2 and 4, it can be seen that lift holes 94 are preferably provided in tabs 96 welded onto core 18 for permitting core 18 to be lifted out of receptacle 28 by an appropriate hoist, not shown. Also, lift holes 98,99 provided in receptacle 28 for permitting receptacle 28, including core 18, to be lifted out of vehicle 10. Further, lift hole 100 is provided in flange 102 of angle member 84 and a similar lift hole (not shown) is provided in flange 104 for permitting core 20 to be lifted from vehicle 10. Of course, when cores 18,20 are to be lifted simultaneously, a portion of the hoist can be engaged in lift hole 98 and another portion of the hoist can be engaged in lift hole 100 of flange 102.

In operation, with core 18 secured in frame 28, both cores 18, 20 mounted in vehicle 10 as hereinabove described, and radiator guard 16 removed, it can be seen that when it is desired to remove only core 18, it is necessary to remove bolts 30 to separate core 18 and frame 28. Also, bolts 64 must be removed to separate core 18 from bar 32. A hoisting apparatus (not shown) can then be connected to lift holes 94 and core 18 can be removed from the vehicle 10.

When it is desired to remove only core 18 and its reinforcing frame 28, bolts 30 will remain intact to interconnect the core 18 and frame 28. Bolts 64 must be removed to release frame 28 from bar 32. Also, bolts 80 must be removed to release frame 28 from bar 34. A hoisting apparatus (not shown) can then be connected to lift holes 98,99, and frame 28 containing core 18 can be removed from vehicle 10.

When it is desired to remove only core 20, bolts 66 must be removed to release core 20 from bar 32. Bolts 82 must be removed to release angle 84 from bar 34. A hoisting apparatus (not shown) may then be connected to lift holes 100 and core 20 can then be independently removed from vehicle 10.

When it is desired to remove both cores 18,20 (including its frame 28) simultaneously from vehicle 10, bolts 65 must be removed to release mounts 86 from bar 32. Also, bolts 90 must be removed to release mounts 86 from bar 34. A hoisting apparatus (not shown) can then be connected to lift holes 100,98, and core 18 in frame 28, interconnected with core 20 by bars 32,34 can then be simultaneously removed from vehicle 10.

The foregoing has described an apparatus for mounting an engine fluid cooling core and an implement fluid cooling core in a vehicle. The apparatus limits stress and strain acting on both cores and provides for relatively easy replacement of either core separately or both cores simultaneously when required for replacement or repair.

The embodiments of the invention in which an exclusive property or privilege is claimed are defined as follows:

1. Apparatus for mounting an engine fluid cooling core and an implement fluid cooling core on a vehicle frame, comprising:
   receptacle means for receiving and for releasably securing the engine cooling core therein;
   means for selective connection to either of the receptacle and the implement cooling core, and for joint connection to the receptacle and the implement core; and
   means for resiliently mounting the means for selective connection on the frame.

2. The apparatus of claim 1 wherein said means for selective connection includes first and second support means for interconnecting the receptacle and the implement core in side-by-side relationship.

3. A vehicle including a frame and apparatus for mounting an engine fluid cooling core and an implement fluid cooling core to the frame, comprising: receptacle means for receiving and releasably securing the engine cooling core therein; and
   means resiliently connected to the frame for selective connection to either of the receptacle and the implement core and for joint connection to the receptacle and the implement cooling cores, said means being spaced apart and connected to the frame.

4. The vehicle of claim 3, wherein said means for selective connection includes first and second support means for interconnecting the receptacle and the implement core in side-by-side relationship.

5. In a vehicle including a frame, apparatus for mounting engine and implement fluid cooling cores to the frame and a receptacle for receiving and releasably securing the engine core therein, the improvement comprising:
   means for selective connection to either of the receptacle and the implement core and for joint connection to the receptacle and the implement core, said means being spaced apart support members resiliently mounted on the frame.

* * * * *